(12) United States Patent
Martin

(10) Patent No.: US 12,472,817 B2
(45) Date of Patent: Nov. 18, 2025

(54) SHAPED PART AND METHOD FOR PRODUCING A SHAPED PART

(71) Applicant: Novem Car Interior Design GmbH, Vorbach (DE)

(72) Inventor: Alexander Martin, Königstein (DE)

(73) Assignee: NOVEM CAR INTERIOR DESIGN GMBH (DE)

( * ) Notice: Subject to any disclaimer, the term of this patent is extended or adjusted under 35 U.S.C. 154(b) by 0 days.

(21) Appl. No.: 18/576,342

(22) PCT Filed: Jul. 8, 2022

(86) PCT No.: PCT/EP2022/069088
§ 371 (c)(1),
(2) Date: Jan. 3, 2024

(87) PCT Pub. No.: WO2023/281064
PCT Pub. Date: Jan. 12, 2023

(65) Prior Publication Data
US 2024/0300329 A1    Sep. 12, 2024

(30) Foreign Application Priority Data
Jul. 8, 2021    (DE) .................... 10 2021 117 675.1

(51) Int. Cl.
*B60K 35/10*    (2024.01)
*B60K 35/22*    (2024.01)
(Continued)

(52) U.S. Cl.
CPC .............. *B60K 35/10* (2024.01); *B60K 35/22* (2024.01); *B60Q 3/14* (2017.02); *B60Q 3/20* (2017.02);
(Continued)

(58) Field of Classification Search
CPC .. B60Q 3/14; B60Q 3/54; B60Q 3/745; B60R 2013/0287; F21W 2106/00; B60K 35/10; B60K 35/22
See application file for complete search history.

(56) References Cited

U.S. PATENT DOCUMENTS 7,441,913 B2 * 10/2008 Bayersdorfer .......... F21V 21/00
                                                            362/240
8,641,251 B2 *  2/2014 Oeuvrard ............... B60K 37/00
                                                            362/509
(Continued)

FOREIGN PATENT DOCUMENTS

DE    102006056272 A1    5/2008
DE    102012101315 A1    8/2013
(Continued)

OTHER PUBLICATIONS

Schlemmer, Backlit perforated composite layer, 2009, DE102007054348B4, https://worldwide.espacenet.com/patent/search/family/040260485/publication/DE102007054348B4?q=pn%3DDE102007054348B4 (Year: 2009).*

(Continued)

*Primary Examiner* — James R Greece
*Assistant Examiner* — Michael Chiang
(74) *Attorney, Agent, or Firm* — Workman Nydegger

(57) ABSTRACT

A method for producing a shaped part that includes: a decorative layer having a front/visible side and a rear/opposite side. The decorative layer has a recess extending into the decorative layer from the rear side. The shaped part includes an illumination and/or display unit with one or more illumination/display elements for displaying a notification on the front side, where the illumination and/or display unit comprises a base body made of a light-conducting material, the illumination and/or display elements are embedded in the base body, the base body is arranged at least (Continued)

partially in the recess in the decorative layer, the display elements are embedded in the base body, and the base body is arranged in the recess. Thus, light emanating from the illumination and/or display element(s) can be guided via the base body, towards the front side, and through the recess.

15 Claims, 4 Drawing Sheets

(51) Int. Cl.
*B60Q 3/14* (2017.01)
*B60Q 3/20* (2017.01)
*B60Q 3/74* (2017.01)
B60K 35/50 (2024.01)
B60Q 3/54 (2017.01)
F21V 9/00 (2018.01)
F21W 106/00 (2018.01)
F21W 121/00 (2006.01)

(52) U.S. Cl.
CPC ............. *B60Q 3/745* (2017.02); *B60K 35/50* (2024.01); *B60K 2360/345* (2024.01); *B60Q 3/54* (2017.02); *F21V 9/00* (2013.01); *F21W 2106/00* (2018.01); *F21W 2121/00* (2013.01)

(56) References Cited

U.S. PATENT DOCUMENTS

| | | | | |
|---|---|---|---|---|
| 10,688,922 | B2* | 6/2020 | Cho | B60R 13/0243 |
| 10,767,838 | B2* | 9/2020 | Kostelnik | F21K 9/61 |
| 10,906,476 | B2* | 2/2021 | Preisler | B60R 13/005 |
| 2002/0101738 | A1* | 8/2002 | Misaras | G02B 6/0008 |
| | | | | 362/85 |
| 2003/0026105 | A1* | 2/2003 | Becher | B60Q 3/745 |
| | | | | 362/490 |
| 2008/0084404 | A1 | 4/2008 | Andre et al. | |
| 2009/0129107 | A1* | 5/2009 | Egerer | B60Q 3/68 |
| | | | | 362/509 |
| 2012/0320615 | A1* | 12/2012 | Englert | B60Q 3/54 |
| | | | | 362/511 |

FOREIGN PATENT DOCUMENTS

| | | | | |
|---|---|---|---|---|
| DE | 202015106328 | | 11/2016 | |
| DE | 102012101315 | B4 * | 7/2018 | ............ B29C 59/16 |
| DE | 202017104082 | U1 | 7/2018 | |
| DE | 102018106258 | B3 | 8/2019 | |
| DE | 102018106259 | | 9/2019 | |
| DE | 102018130738 | | 6/2020 | |
| DE | 102019121917 | | 2/2021 | |
| DE | 102007054348 | B4 * | 8/2021 | .............. D06N 3/00 |
| EP | 2024170 | B1 | 11/2011 | |
| EP | 3573043 | | 11/2019 | |
| WO | 2006/018067 | A1 | 2/2006 | |

OTHER PUBLICATIONS

Egerer et al., Molded part and method for producing a molded part, 2013, DE102012101315B4, https://patents.google.com/patent/DE102012101315B4/en?oq=de+102012101315 (Year: 2013).*

International Search Report for PCT App. PCT/EP2022/069088 mailed Nov. 14, 2022.

International Preliminary Report on Patentability received for PCT Patent Application No. PCT/EP2022/069088, mailed on Jan. 18, 2024, 21 pages (11 pages of English Translation and 10 pages of Original Document).

International Search Report and Written Opinion received for PCT Patent Application No. PCT/EP2022/069088, mailed on Nov. 14, 2022, 26 pages (12 pages of English Translation and 14 pages of Original Document).

* cited by examiner

SHAPED PART AND METHOD FOR PRODUCING A SHAPED PART

CROSS-REFERENCE TO RELATED APPLICATIONS

The present invention is a 35 U.S.C. § 371 U.S. National Stage of PCT Application No. PCT/EP2022/069088, filed on Jul. 8, 2022, which claims priority to DE 102021117675.1, filed on Jul. 8, 2021. The entire content of each of the aforementioned patent applications is incorporated herein by reference.

BACKGROUND OF THE INVENTION

1. Field of the Invention

The invention relates to a shaped part, in particular to a decorative and/or panel part designed as a shaped part for the interior of a vehicle, and to a method for producing a shaped part.

2. The Relevant Technology

Shaped parts comprise a decorative layer having a front side designed as a visible side and a rear side opposite the front side. Numerous decorative and panel parts are installed in the vehicle interior, for example door panels, console panels, and instrument panels. The decorative and panel parts also include control buttons and the covers of control buttons.

It is desirable to achieve uniform and as smooth as possible design surfaces. This means that any control and/or information and/or illumination functions or functional components required to achieve these functions, such as switches, buttons or illumination and/or display units, such as displays or illumination elements, should be visible only when in use, i.e., when in the active state. In order to achieve this, it is known to integrate such functions or functional components into the shaped parts in such a way that they are not visible when not in use, i.e., when in the inactive state. As a result, the visible side of the decorative part appears as a smooth, uninterrupted and uniform design surface to the observer when not in use.

For example, shaped parts are known the decorative layer of which has a microperforation formed by a plurality of through-holes. A display can be arranged in the region of the microperforation on the rear side of the decorative layer such that visible light emanating from the display is guided from the rear side of the decorative layer through the holes to the front side of the decorative layer, so that notifications shown by the display are visible on the visible side of the decorative layer of the shaped part.

There is always a need to display the notifications on the front side of the decorative layer in sufficient luminance, edge sharpness and in the desired shade, which can be achieved by the holes via which the light is guided to the front side of the decorative layer. However, these holes in turn result in increased viewing angle dependence, i.e., in different levels of readability of the notification from different positions. For example, the notification is visible only in an angular width of about 90°. Furthermore, the representation can be impaired, for example, by a scattering of the light emanating from the display within the holes at the interface to the decorative material of the decorative layer. In order to prevent or at least minimize these effects, it is known, for example, to fill the holes with a liquid, transparent or translucent material in order to guide the light emanating from the display in a targeted manner through the holes and to the front side of the decorative layer (so-called "filler" methods). However, in particular with open-pore decorative layers, for example when wood or wood veneers are used as decorative material for the decorative layer, this liquid material can penetrate into the pores of the decorative material, which can lead to undesired swelling of the decorative material.

BRIEF SUMMARY OF THE INVENTION

The object of the present invention is to specify a new shaped part which corresponds to the requirements mentioned above and, in particular, enables an excellent display of notifications or visualization of an illumination on the front side of the decorative layer. The object of the invention is also to provide a new method for producing a shaped part.

This object is achieved in terms of the shaped part by the features of claim 1 and in terms of the method by the features of claim 9. Advantageous embodiments and developments are provided in each of the dependent claims.

The shaped part according to the invention, in particular a decorative part and/or a panel part for a vehicle interior formed as a shaped part, comprises, a decorative layer having a front side designed as a visible side and a rear side opposite the front side, wherein the decorative layer has a recess which extends into the decorative layer starting from the rear side of the decorative layer.

The shaped part according to the invention also comprises an illumination and/or display unit with one or more illumination and/or display elements for realizing an illumination and/or for displaying a notification on the front side of the decorative layer. The notification can be, for example, variable images or also a constant symbol.

According to the invention, the illumination and/or display unit comprises a base body made of a light-conducting material, wherein the illumination and/or display elements are embedded in the base body. The base body is arranged at least partially in (or: within) the recess in the decorative layer. The illumination and/or display elements are embedded in the base body and the base body is arranged at least partially in the recess in such a way that light emanating from the illumination and/or display element(s) is or can be guided in each case via the base body, towards the front side, and through the recess.

The base body is preferably formed from a transparent or translucent material, in particular a transparent or translucent plastic, or comprises a transparent or translucent material, in particular a translucent or transparent plastic. Such a material is or comprises, for example, polymethyl methacrylate PMMA or polycarbonate PC or polyurethane PU. The base body guides the light emitted in each case by the illumination and/or display element(s), i.e., the illumination and/or display elements have a common light guide.

The illumination and/or display elements are preferably LEDs or a display, for example LCDs or LED displays or PLED displays. The illumination and/or display elements are embedded in the base body, wherein the wording "embedded in the base body" is understood to mean that the illumination and/or display elements are arranged at least partially within the base body or are at least partially integrated into the base body and connected thereto. The illumination and/or display elements are not necessarily completely surrounded or enclosed by the base body.

The recess extends at least partially into the decorative layer starting from the rear side of the decorative layer towards the front side of the decorative layer (hereinafter also: "depth direction"), i.e., it is formed in a section of the decorative layer which faces the rear side of the decorative layer. The recess can extend into the decorative layer in parallel and/or congruently or obliquely to a surface normal of the rear side of the decorative layer. The cross section of the recess in a direction perpendicular to the direction from the rear side of the decorative layer towards the front side of the decorative layer ("transverse direction") can be round or elliptical or angular. For example, the recess can be designed to be cylindrical or cuboidal. The cross-sectional dimension of the recess is, for example, in a range of 100 to 500 mm.

A significant advantage of the invention is, in particular, that the base body functioning as a light guide is designed as a "solid" material or that the illumination and/or display unit comprising the base body and the illumination and/or display elements are designed as a "solid" component and are arranged or installed in the recess of the decorative layer. Undesired swelling and/or an undesired change in color and/or any other undesired change of the decorative layer, as can occur when filling in liquid or low-viscosity material, is thus prevented.

Furthermore, the recess reduces an attenuation of the light compared to shaped parts in which an illumination and/or display unit is arranged on the rear side of the decorative layer, since the decorative layer is designed to be thinner in the region of the recess.

The shaped part according to the invention further offers in particular the advantage that light emitted by the illumination and/or display element(s) is guided, by means of the base body, through the recess towards the front side of the decorative layer of the shaped part, without scattering effects occurring within the recess. As a result, a notification can be made visible or displayed, or an illumination realized, with excellent edge sharpness and luminance in an angular width at the visible side of the shaped part. Furthermore, the color locus or color representation remains unchanged. The angular width of visibility of the notification is understood to mean, in particular, the region or angular range in which the notification can be seen by an observer looking onto the front side of the decorative layer. For example, the angular width can be about 90°.

One embodiment variant of the invention provides for the decorative layer to be or comprise a wood veneer. However, the decorative layer may also comprise or consist of metal, for example aluminum, and/or carbon and/or stone and/or textile materials and/or fabric and/or plastic, for example a plastic film.

Also, the decorative layer can consist not only of one decorative coat but also of two or more coats. For example, in addition to the decorative coat which can be one of the aforementioned materials, the decorative layer may have an additional coat, for example a nonwoven coat for stabilizing the decorative layer and/or an opaque coat and/or one or more adhesive coats.

According to a preferred embodiment, the recess extends into the decorative layer from the rear side of the decorative layer over a length of about 70 to 90% of the thickness (or: depth) of the decorative layer. In other words, a section of the decorative layer present or formed between the recess and the front side of the decorative layer has a thickness of about 10 to 30% of the thickness of the remaining decorative layer surrounding the recess. The recess can be completely delimited relative to the front side of the decorative layer in the depth direction. For example, an ambient illumination can thus be realized by the thin section being backlit by means of the illumination and/or display unit.

According to an advantageous embodiment, a section of the decorative layer formed between the recess and the front side of the decorative layer can have one or more holes each extending linearly along their respective longitudinal axis between the recess and the front side of the decorative layer. An extension of the holes along their longitudinal axis, i.e., a length of the holes, is in particular small compared to a thickness or depth of the decorative layer and preferably corresponds to the thickness of the section.

The holes (or: openings) can form a microperforation in the region of the recess in the decorative layer. The material of the section of the decorative layer and thus the material of the decorative layer is removed in the region of the holes. The holes thus form a passage between the recess and the front side of the decorative layer. The longitudinal axis of each hole through which visible light is guided from the recess to the front side of the decorative layer can be oriented parallel and/or congruent or obliquely to a surface normal of the front side of the decorative layer at the exit point of the corresponding hole. Furthermore, the holes can run in particular parallel to one another. The cross section of the holes perpendicular to their respective longitudinal axis can be round or elliptical or angular. The cross-sectional dimensions of these holes are, for example, in the range from 50 to 150 μm, for example 90 μm. All of the holes can be evenly distributed over the microperforation region. In this case the hole density is constant. All holes can also have the same cross-sectional shape and the same dimensions. A circle, for example, comes into consideration as a cross-sectional shape. Thus, circular holes, for example, could be evenly distributed in the region of the microperforation of the decorative layer. The hole diameters are preferably selected in such a way that the holes on the visible side are not visible to an observer when viewed normally without aids and without backlighting, that is to say the observer only sees the uniform, continuous, seamless design. An interruption in the design due to a display only becomes visible when the holes are backlit.

The reproduction of brightness and/or color locus or color representation by the display and/or illumination elements is greatly increased or at least improved by the microperforation compared to decorative layers without microperforation. The microperforation also increases the edge sharpness of the notification displayed. By means of the display and/or illumination unit, for example, notifications can be displayed with high resolution without the decorative surface being visually impaired, since the display and/or illumination elements are not visible either in the active state or in the inactive state. Also, scattering effects within these holes are also low if the length of the holes is small compared to the thickness of the decorative layer.

The illumination and/or display elements are preferably embedded in the base body on a rear side of the base body opposite the front side of the decorative layer. As a result, the illumination and/or display elements are accessible from the rear side of the base body and can, for example, be electrically contacted in a simple manner.

According to a preferred embodiment, the base body completely fills the recess in a depth direction and/or in a transverse direction extending perpendicular to the depth direction, preferably the entire cross section of the recess perpendicular to the depth direction. Depth direction is understood here to mean a direction from the rear side of the decorative layer towards the front side of the decorative layer.

The illumination and/or display unit can be arranged completely within the recess. According to a further advantageous embodiment variant, the base body extends beyond the recess starting from the rear side of the decorative layer, in particular in a direction perpendicular to the rear side of the decorative layer ("vertical direction") and/or in a direction along the rear side of the decorative layer ("lateral direction"). In other words, the base body is arranged such that it protrudes from the recess on the rear side of the decorative layer and/or extends beyond the edge of the recess. The illumination and/or display elements are preferably arranged in the portion of the base body projecting in the region of the recess. If the base body extends beyond the recess, the illumination and/or display unit can simultaneously also fulfill the function of a support, which support can then be dispensed with. It has hitherto been customary for such a support, typically made of, or comprising, a plastic, for example polyurethane PUR and/or polycarbonate PC, to be arranged on the rear side of the decorative layer, for example injection-molded onto the rear side of the decorative layer by means of injection molding or alternatively, in particular glued or pressed on by means of one or more adhesive coats.

Such a support is also used to attach fastening elements, for example clips which are required for mounting in the vehicle interior, to the shaped part. According to an advantageous embodiment, it may therefore be provided for the shaped part to have one or more fastening elements for fastening the shaped part in a vehicle interior which are preferably integrated into the base body or arranged on the base body or are formed by the base body. The fastening elements are, in particular, integrated into the base body on the rear side of the base body or arranged on the rear side of the base body or formed on the rear side of the base body. This results in the advantage that an additional support can be dispensed with, since fastening elements required for mounting in the vehicle interior are already integrated in the illumination and/or display unit.

It is further preferred for a transparent or translucent protective and/or optical layer, in particular a transparent or translucent lacquer, to be arranged or applied on the front side of the decorative layer, which, in particular, extends into the holes, if the latter are provided. Preferably, the protective and/or optical layer fills the holes completely. The protective and/or optical layer can be designed to be open-pored or high-gloss. The protective and/or optical layer can, for example, be poured on and/or sprayed on. The protective and/or optical layer comprises, for example, polyurethane ("PUR") or is formed from PUR.

The method according to the invention for producing a shaped part comprising a decorative layer having a front side designed as a visible side and a rear side opposite the front side, wherein the decorative layer has a recess which extends into the decorative layer from the rear side of the decorative layer, and comprising an illumination and/or display unit with a base body and one or more illumination and/or display elements embedded in the base body for realizing an illumination and/or for displaying a notification, which can be, for example, variable images or also a constant symbol, on the front side of the decorative layer, in particular a shaped part according to the invention, comprising the steps of:
 a) providing a decorative material to form the decorative layer;
 b) introducing a recess into the decorative material from a rear side of the decorative material forming the rear side of the decorative layer;
 c) providing and/or producing an illumination and/or display unit comprising a base body made of a light-conducting material and one or more illumination and/or display elements embedded in the base body;
 d) assembling the illumination and/or display unit and decorative material by inserting or introducing the illumination and/or display unit into the recess from the rear side of the decorative material provided as the rear side of the decorative layer.

The base body is preferably formed or produced from a transparent or translucent material, in particular a transparent or translucent plastic, or a material comprising a transparent or translucent material, in particular a transparent or translucent plastic, for example by means of injection molding or pressing. Such a material is or comprises, for example, PMMA or polycarbonate.

Preferably, LEDs or a display, for example LCDs or LED displays or PLED displays, are provided as illumination and/or display elements. The illumination and/or display elements are embedded in the base body, wherein the wording "embedded in the base body" is understood to mean that the illumination and/or display elements are arranged at least partially within the base body or are at least partially integrated into the base body and connected thereto. The illumination and/or display elements are not necessarily completely surrounded or enclosed by the base body.

The recess is introduced at least partially into the decorative layer from the rear side of the decorative layer towards the front side of the decorative layer (hereinafter also: "depth direction") and is thus formed in a section of the decorative layer which faces the rear side of the decorative layer. The recess can be introduced such that it extends into the decorative layer parallel and/or congruent or obliquely to a surface normal of the rear side of the decorative layer. Furthermore, the recess can be introduced such that the cross section of the recess in a direction perpendicular to the direction from the rear side of the decorative layer towards the front side of the decorative layer ("transverse direction") is round or elliptical or angular. For example, the recess can be introduced in a cylindrical or cuboidal manner. The cross-sectional dimension of the recess is, for example, in a range of 100 to 500 mm.

The recess can be introduced in that the decorative material is removed or thinned in sections starting from a rear side of the decorative material forming the rear side of the decorative layer, for example by means of lasing or fine cutting (also fine blanking).

The decorative material may be or may comprise a wood veneer. However, the decorative material may also comprise or consist of metal, for example aluminum, and/or carbon and/or stone and/or textile materials and/or fabric and/or plastic, for example a plastic film.

The decorative material can consist only of one coat. However, the provided decorative material may also be a decorative material consisting of two or more coats. For example, in addition to a decorative coat which can be one of the aforementioned materials, the decorative material may have an additional coat, for example a nonwoven coat for stabilizing the decorative layer and/or an opaque coat and/or one or more adhesive coats.

A significant advantage of the invention is, in particular, that the base body functioning as a light guide is produced and/or provided as a "solid" material or that the illumination and/or display unit comprising the base body and the illumination and/or display elements are produced and/or provided as a "solid" component and are assembled in one method step with the decorative layer, by inserting or introducing the illumination and/or display unit as a whole into the recess from the rear side of the decorative material provided as the rear side of the decorative layer. Undesired swelling and/or an undesired change in color and/or any other undesired change of the decorative layer, as can occur when filling in liquid or low-viscosity material, is thus prevented.

According to a preferred embodiment, the recess is introduced from the rear side of the decorative material forming the rear side of the decorative layer such that the recess extends into the decorative layer over a length of about 70 to 90% of the thickness (or: depth) of the decorative layer. In other words, by introducing the recess, a section of the decorative layer is formed between the recess and the front side of the decorative layer, which section has a thickness of about 10 to 30% of the thickness of the remaining decorative layer surrounding the recess. The recess is thus delimited relative to the front side of the decorative layer in the depth direction, whereby, for example, an ambient illumination can be realized by the thin section being backlit.

Furthermore, according to an advantageous embodiment, one or more holes each extending linearly along their respective longitudinal axis between the recess and the front side of the decorative material can be introduced into a section of the decorative material formed between the recess and the front side of the decorative layer.

Introduction of the holes into the decorative material to form the microperforation can be done by means of lasing or fine cutting (also fine blanking).

The holes are preferably introduced into the decorative layer such that the longitudinal axis of each hole is arranged parallel and/or congruent and/or obliquely to a surface normal of the front side of the decorative layer at the exit point of the corresponding hole. Furthermore, the holes can run in particular parallel to one another.

The holes are preferably designed such that the cross section of the holes perpendicular to their longitudinal axis is round or elliptical or angular.

The decorative material can be microperforated at least in regions, i.e., a microperforation is formed by a plurality of holes introduced into a region of the decorative material. The material of the section of the decorative layer and thus the material of the decorative layer is removed in the region of the holes. The cross-sectional dimensions of the holes are, for example, in the range from 50 to 150 µm, for example 90 µm. All of the holes can be evenly distributed over the microperforation region so that the hole density is constant. Also, all holes can be designed to have the same cross-sectional shape and the same dimensions. A circle, for example, comes into consideration as a cross-sectional shape. Thus, circular holes, for example, could be evenly distributed in the region of the microperforation of the decorative layer. The hole diameters are preferably selected in such a way that the holes on the visible side are not visible to an observer when viewed normally without aids and without backlighting, that is to say the observer only sees the uniform, continuous, seamless design. An interruption in the design due to a display only becomes visible when the holes are backlit.

The reproduction of brightness and/or color locus or color representation by the display and/or illumination elements is greatly increased or at least improved by the microperforation compared to decorative layers without microperforations. The microperforation also increases the edge sharpness of the notification displayed. By means of the display and/or illumination unit, for example, notifications can be displayed with high resolution without the decorative surface being visually impaired, since the display and/or illumination elements are not visible either in the active state or in the inactive state.

Providing and/or producing an illumination and/or display unit according to step c) preferably comprises the steps of:

c1) providing one or more illumination and/or display elements;

c2) forming the base body such that it can be introduced or inserted into the recess; and c3) embedding the illumination and/or display elements into the base body such that light emanating from the illumination and/or display element(s) is guided in each case via the base body, towards the front side, and through the recess.

The illumination and/or display elements are, in particular, embedded into the base body on a rear side of the base body, whereby the illumination and/or display elements can be accessed from the rear side of the base body and can be electrically contacted in a simple manner, for example.

It is also advantageous if the base body is designed such that its shape and/or dimension corresponds to the recess and/or that the base body, in the assembled state, extends from the rear side of the decorative layer beyond the recess, in particular in a direction perpendicular to the rear side of the decorative layer ("vertical direction") and/or in a direction along the rear side of the decorative layer ("lateral direction"). In other words, the base body is designed such that it protrudes, in the assembled state, from the recess on the rear side of the decorative layer and/or extends beyond the edge of the recess. The illumination and/or display elements are preferably arranged in the portion of the base body that, in the assembled state, projects in the region of the recess. If the base body is designed in such a way, the illumination and/or display unit can simultaneously also fulfill the function of the support, which support can then be dispensed with.

Furthermore, it may be provided for one or more fastening elements for fastening the shaped part in a vehicle interior to be integrated into the base body or arranged on the base body or formed by the base body. The fastening elements may be, in particular, integrated into the base body on the rear side of the base body or arranged on the rear side of the base body or formed on the rear side of the base body. This results in the advantage that no additional support is required for this purpose either, since fastening elements, for example clips, required for mounting in the vehicle interior are already integrated into the illumination and/or display unit.

According to a preferred embodiment, in a further step e), a transparent or translucent protective and/or optical layer, in particular a transparent or translucent lacquer, is arranged or applied on the front side of the decorative layer, in particular such that, if present, the protective and/or optical layer extends into the holes and, further preferably, fills them completely. The protective and/or optical layer can be designed to be open-pored or high-gloss and can, for example, be poured on and/or sprayed on. For example, the protective and/or optical layer is formed from polyurethane ("PUR") or from a material comprising PUR.

BRIEF DESCRIPTION OF THE DRAWINGS

The invention is explained in more detail below also with regard to further features and advantages on the basis of the description of the exemplary embodiments and with reference to the accompanying schematic drawings. In the figures.

DETAILED DESCRIPTION

Figure 1:
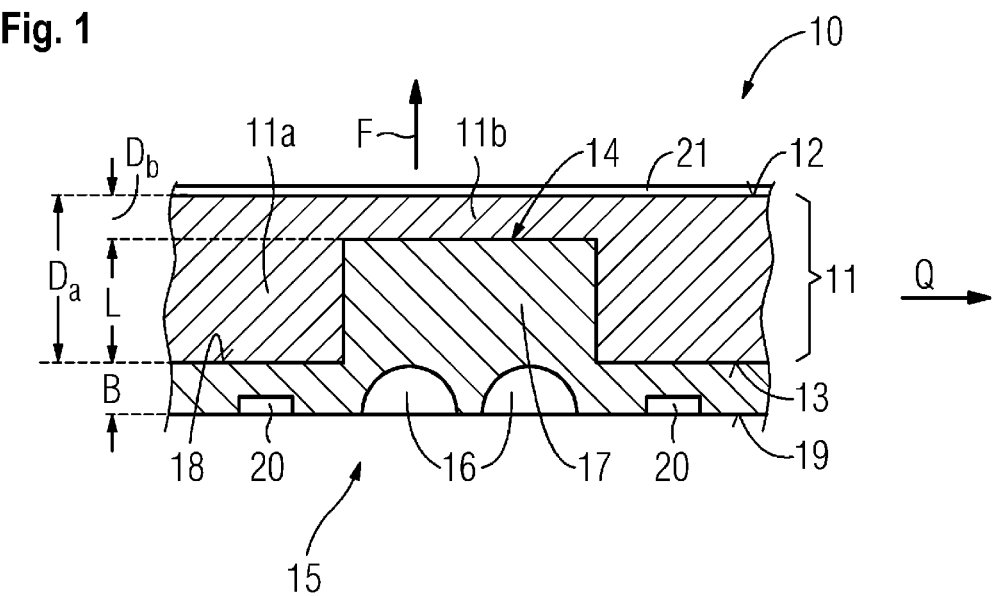
FIG. 1 shows a detail of a shaped part according to the invention in accordance with a first embodiment.
Figure 2A:
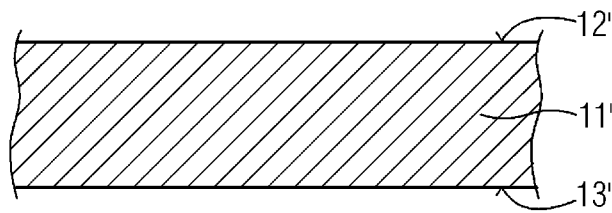
FIG. 2 shows the essential steps of the method according to the invention for producing a shaped part in accordance with the first embodiment.
Figure 2B:
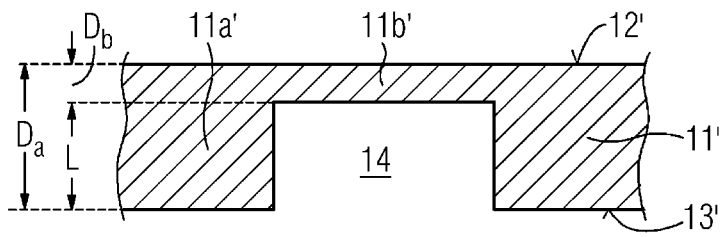
Figure 2C:
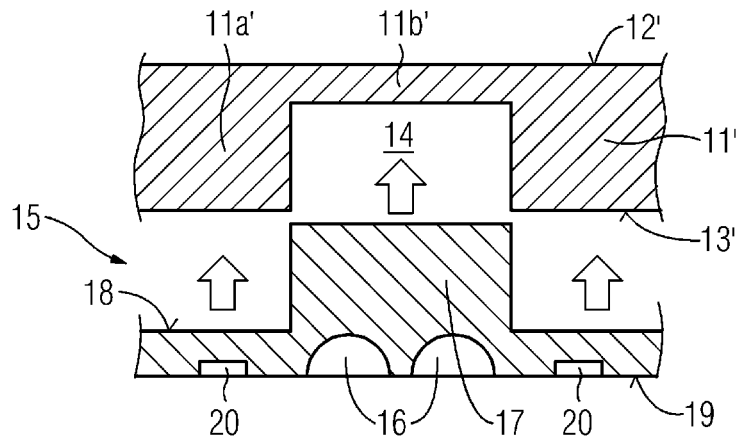
Figure 2D:
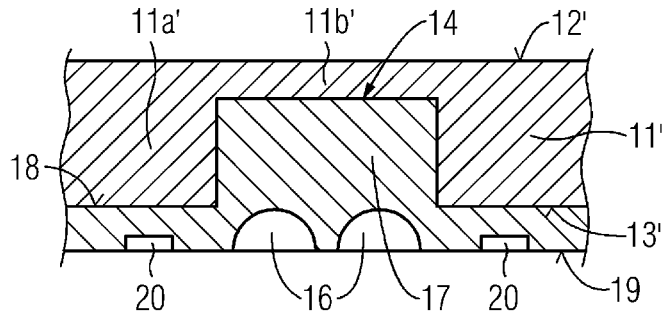
Figure 2E:
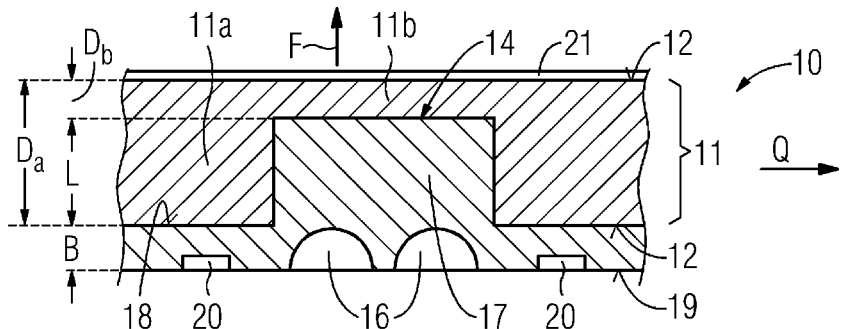

The inventive shaped part 10 according to a first embodiment (FIG. 1) comprises a decorative layer 11 having a front side 12 designed as a visible side and a rear side 13 opposite the front side 12. The decorative layer 11 comprises, for example, a wood veneer as a decorative coat which is designed to be at least largely opaque, and one or more additional coats, for example stabilizing layers or adhesive layers.

The decorative layer 11 has a recess 14 which extends into the decorative layer starting from the rear side 13 of the decorative layer 11 towards the front side 12 of the decorative layer 11, in the present case over a length L of about 80% of the thickness $D_a$ of the decorative layer 11 and perpendicular to the rear side 13 and the front side 12, i.e., in a depth direction F parallel to a surface normal perpendicular to the rear side 13. A section 11b of the decorative layer 11 is thus formed between the recess 14 and the front side 12 of the decorative layer 11, which section 11b has a thickness $D_b$ which in the present case is about 20% of the thickness $D_a$ of the remaining decorative layer 11 or of the portion 11a of the decorative layer 11 surrounding the recess 14.

The shaped part 10 also comprises an illumination and/or display unit 15 with, in the present case, two illumination and/or display elements 16 for realizing an illumination and/or for displaying a notification on the front side 12 of the decorative layer 11. The illumination and/or display unit 15 moreover comprises a base body 17 having a front side 18 and a rear side 19 opposite the front side 18 made of a light-conducting material, for example a transparent plastic such as PMMA. The front side 18 of the base body 17 is in planar contact with the decorative layer 11. The rear side 19 of the base body 17 lies opposite or faces away from the front side 12 of the decorative layer 11. The illumination and/or display elements 16 are embedded in the base body 17; in the present case, they are integrated in the base body 17 at the rear side 19 of the base body 17.

The base body 17 completely fills the recess 14, both in the depth direction F and in a transverse direction Q perpendicular to the depth direction F. The base body 17 thus rests completely against the recess 14 within the recess 14.

Furthermore, the base body 17 extends beyond the recess 14 starting from the rear side 13 of the decorative layer 11 or sticks out of the recess 14 with a portion B and protrudes over the edge of the recess 14, both in a vertical direction perpendicular to the rear side of the decorative layer 11 and in a lateral direction along the rear side 13 of the decorative layer 11. The illumination and/or display elements 16 are arranged in the region of the recess 14 in the projecting portion B of the base body 17.

The shaped part 10 also comprises fastening elements 20, two of which are shown by way of example in FIG. 1, which in turn are integrated into the base body 17 on the rear side 19 of the base body 17 and by means of which the shaped part 10 can be mounted within the vehicle interior.

Furthermore, a transparent or translucent protective and/or optical layer 21 made of lacquer, for example PUR, is provided on the front side 12 of the decorative layer 11.

To produce a shaped part 10 according to the first embodiment, a decorative material 11' having a front side 12' forming the front side 12 of the decorative layer 11 and having a rear side 13' forming the rear side 13 of the decorative layer 11 is first (step a)) provided for forming a decorative layer 11 having a front side 12 designed as a visible side and a rear side 13 opposite the front side 12 (FIG. 2). By way of example, the decorative material comprises a wood veneer for forming a decorative coat as well as one or more additional coats, for example stabilizing layers or adhesive layers.

In a further step b), starting from the rear side 13' of the decorative material 11', a recess 14 is introduced into the decorative material 11', for example over a length L of about 80% of the thickness $D_a$ of the decorative material 11', so that a section 11b' of the decorative material 11' is formed between the recess 14 and the front side 12' of the decorative material 11', which section 11b' has a thickness $D_b$ that is reduced compared to a thickness $D_a$ of portion 11a' of the remaining decorative material 11' and is about 20% of thickness $D_a$.

In a further step c), an illumination and/or display unit 15 comprising a base body 17 made of a light-conducting material and one or more illumination and/or display elements 16 embedded in the base body 17 are provided and/or produced.

This can take place in particular such that one or more illumination and/or display elements 16 are initially provided (step c1)). The base body 17 is then designed such that it can be inserted into the recess 14 (step c2)). The base body 17 is produced, for example, from a transparent or translucent plastic such as PMMA by means of injection molding or pressing. A shaping tool, for example an injection molding machine or press tool, is used for this purpose, the cavity of which is designed such that the shape and dimensions of the produced base body 17 correspond to the recess, and the base body 17 may also extend in the lateral and vertical direction beyond the recess 14 when assembled, i.e., that a portion B of the base body 17 protruding beyond the edge of the recess 14 is formed. The illumination and/or display elements 16 are embedded into the base body 17 such that light emanating from the illumination and/or display element(s) 16 is guided in each case via the base body 17, towards the front side 12', and through the recess 14. In the present case, the illumination and/or display elements 16 are embedded into the base body 17 on the rear side 19 of the base body 17, for example by inserting the illumination and/or display elements 16 into the cavity of the shaping tool and subsequently injecting or filling the material of the base body 17 into the cavity and forming the base body under pressure and/or elevated temperature.

Furthermore, for example two fastening elements 20 are integrated into the base body 17, which, for example, can also be inserted into the cavity of the shaping tool and then integrated into the base body 17 by injecting or filling the material of the base body 17.

In a further step d), the illumination and/or display unit 15 and the decorative material 11' are assembled by inserting or introducing the illumination and/or display unit 15 into the recess 14 from the rear side 13' of the decorative material 11' provided as the rear side 13 of the decorative layer 11 and, if necessary, by gluing or pressing it to the recess and/or rear side 13 of the decorative layer 11. In the present case, the illumination and/or display unit 15 is inserted such that the base body 17 extends into the recess 14 over the entire length L of the recess 14, fills the recess 14 in the transverse direction Q and projects beyond the edge of the recess 14.

In a further step e), a transparent or translucent protective and/or optical layer 21 made of a lacquer, for example PUR, is applied, for example sprayed or poured, onto the front side 12 of the decorative layer 11.

Figure 3:
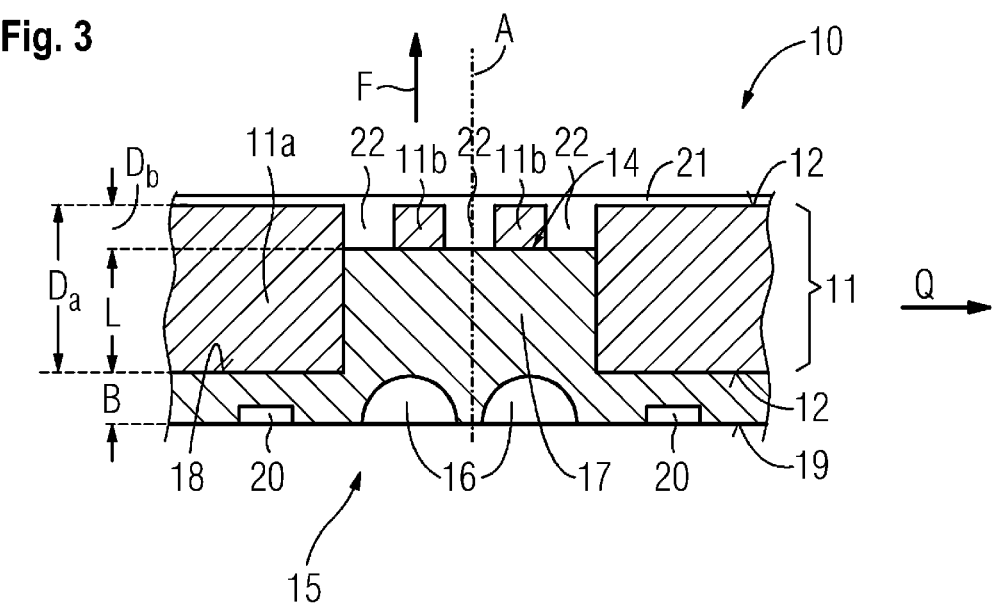
FIG. 3 shows a detail of a shaped part according to the invention in accordance with a second embodiment.
Figure 4A:
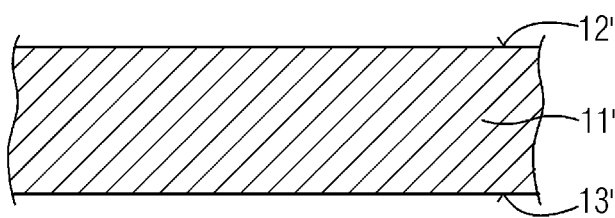
FIG. 4 shows the essential steps of the method according to the invention for producing a shaped part in accordance with the second embodiment.
Figure 4B:
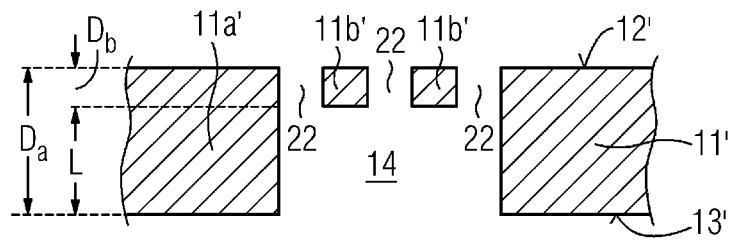
Figure 4C:
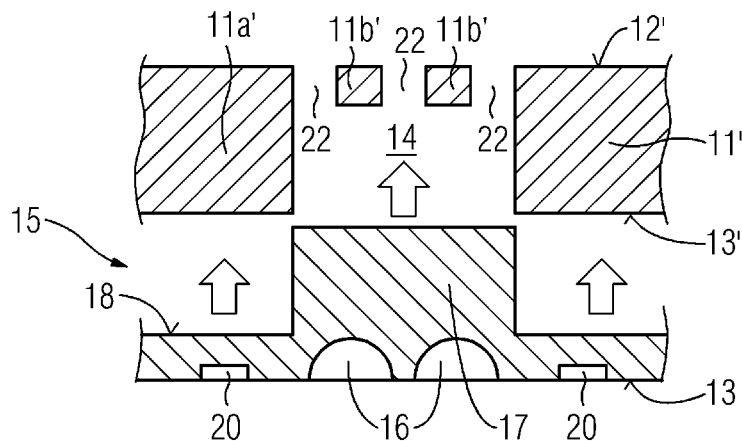
Figure 4D:
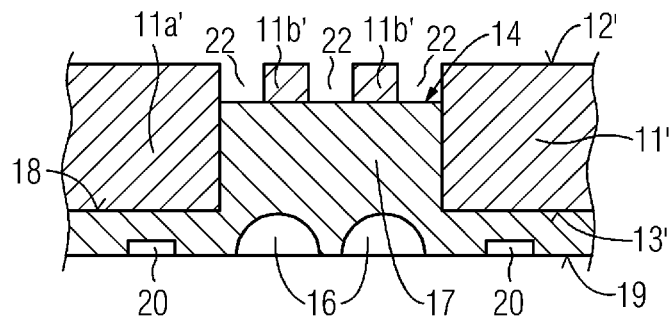
Figure 4E:
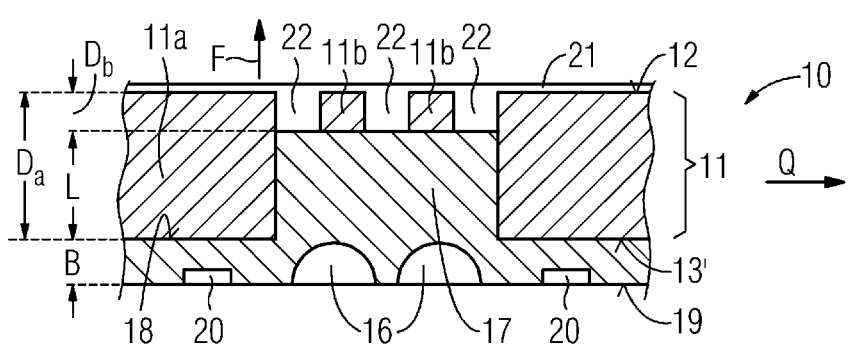

FIG. 3 shows a shaped part 10 according to a second embodiment, comprising a decorative layer 11 having a front side 12 designed as a visible side and a rear side 13 opposite the front side 12. The decorative layer 11 comprises, for example, a wood veneer as a decorative coat which is designed to be at least largely opaque, and one or more additional coats, for example stabilizing layers or adhesive layers.

The decorative layer 11 has a recess 14 which extends into the decorative layer starting from the rear side 13 of the decorative layer 11 towards the front side 12 of the decorative layer 11, in the present case over a length L of about 80% of the thickness $D_a$ of the decorative layer 11 and perpendicular to the rear side 13 and the front side 12, i.e., in a depth direction F parallel to a surface normal perpendicular to the rear side 13. A section 11b of the decorative layer 11 is thus formed between the recess 14 and the front side 12 of the decorative layer 11, which section 11b has a thickness $D_b$ which in the present case is about 20% of the thickness $D_a$ of the remaining decorative layer 11 or of a portion 11a of the decorative layer 11 surrounding the recess 14.

The section 11b formed between the recess 14 and the front side 12 of the decorative layer 11 also has multiple holes 22, in the present case three holes 22, each extending linearly along their respective longitudinal axis A between the rear side 13 and the front side 12 of the decorative layer 11. The longitudinal axis A runs parallel to a surface normal of the front side 12 or parallel to the depth direction F. In the present case, the holes 22 have a circular cross section perpendicular to their longitudinal axis A and run parallel to one another.

The shaped part 10 also comprises an illumination and/or display unit 15 with, in the present case, two illumination and/or display elements 16 for realizing an illumination and/or for displaying a notification on the front side 12 of the decorative layer 11. The illumination and/or display unit 15 moreover comprises a base body 17 having a front side 18 and a rear side 19 opposite the front side 18 made of a light-conducting material, for example a transparent plastic such as PMMA. The front side 18 of the base body 17 is in planar contact with the decorative layer 11. The rear side 19 of the base body 17 lies opposite or faces away from the front side 12 of the decorative layer 11. The illumination and/or display elements 16 are embedded in the base body 17; in the present case, they are integrated in the base body 17 at the rear side 19 of the base body 17.

The base body 17 completely fills the recess 14, both in the depth direction F and in a transverse direction Q perpendicular to the depth direction F. The base body 17 thus rests completely against the recess 14 within the recess 14.

Furthermore, the base body 17 extends beyond the recess 14 starting from the rear side 13 of the decorative layer 11 or sticks out of the recess 14 with a portion B and protrudes over the edge of the recess 14, both in a vertical direction perpendicular to the rear side of the decorative layer 11 and in a lateral direction along the rear side 13 of the decorative layer 11. The illumination and/or display elements 16 are arranged in the region of the recess 14 in the projecting portion B of the base body 17.

The shaped part 10 also comprises fastening elements 20, two of which are shown by way of example in FIG. 3, which in turn are integrated into the base body 17 on the rear side 19 of the base body 17 and by means of which the shaped part 10 can be mounted within the vehicle interior.

Furthermore, a transparent or translucent protective and/or optical layer 21 made of lacquer, for example PUR, is provided on the front side 12 of the decorative layer 11 which moreover fills the holes 22.

To produce a shaped part 10 according to the second embodiment, a decorative material 11' having a front side 12' forming the front side 12 of the decorative layer 11 and having a rear side 13' forming the rear side 13 of the decorative layer 11 is first (step a)) provided for forming a decorative layer 11 having a front side 12 designed as a visible side and a rear side 13 opposite the front side 12 (FIG. 4). For example, the decorative material comprises a wood veneer for forming a decorative coat as well as one or more additional coats, for example stabilizing layers or adhesive layers.

In a further step b), starting from the rear side 13' of the decorative material 11', a recess 14 is introduced into the decorative material 11', for example over a length L of about 80% of the thickness $D_a$ of the decorative material 11', so that a section 11b' of the decorative material 11' is formed between the recess 14 and the front side 12' of the decorative material 11', which section 11b' has a thickness $D_b$ that is reduced compared to a thickness $D_a$ of portion 11a' of the remaining decorative material 11' and is about 20% of thickness $D_a$.

Furthermore, multiple holes 22, in the present case three holes 22, are introduced into the section 11b' formed between the recess 14 and the front side 12' of the decorative material 11', for example by lasing or fine blanking. The holes 22 are introduced such as to extend linearly along their respective longitudinal axis A between the rear side 13' and the front side 12' of the decorative material 11'. The longitudinal axis A runs parallel to a surface normal of the front side 12 or parallel to the depth direction F. In the present case, the holes 22 have a circular cross section perpendicular to their longitudinal axis A and run parallel to one another. Moreover, in the present case, the holes 22 are designed to have a circular cross section perpendicular to their longitudinal axis A and to run parallel to one another.

In a further step c), an illumination and/or display unit 15 comprising a base body 17 made of a light-conducting material and one or more illumination and/or display elements 16 embedded in the base body 17 are provided and/or produced.

This can take place in particular such that one or more illumination and/or display elements 16 are initially provided (step c1)). The base body 17 is then designed such that it can be inserted into the recess 14 (step c2)). The base body 17 is produced, for example, from a transparent or translucent plastic such as PMMA by means of injection molding or pressing. A shaping tool, for example an injection molding machine or press tool, is used for this purpose, the cavity of which is designed such that the shape and dimensions of the produced base body 17 correspond to the recess 14, and the base body 17 may also extend in the lateral and vertical direction beyond the recess 14 when assembled, i.e., that a portion B of the base body 17 protruding beyond the edge of the recess 14 is formed. The illumination and/or display elements 16 are embedded into the base body 17 such that light emanating from the illumination and/or display element(s) 16 is guided in each case via the base body 17, towards the front side 12', and through the recess 14. In the present case, the illumination and/or display elements 16 are embedded into the base body 17 on the rear side 19 of the base body 17, for example by inserting the illumination and/or display elements 16 into the cavity of the shaping tool and subsequently injecting or filling the material of the base body 17 into the cavity and forming the base body 17 under pressure and/or elevated temperature.

Furthermore, for example two fastening elements 20 are integrated into the base body 17, which, for example, can also be inserted into the cavity of the shaping tool and then integrated into the base body 17 by injecting or filling the material of the base body 17.

In a further step d), the illumination and/or display unit 15 and the decorative material 11' are assembled by inserting or introducing the illumination and/or display unit 15 into the recess 14 from the rear side 13' of the decorative material 11' provided as the rear side 13 of the decorative layer 11 and, if necessary, by gluing or pressing it to the recess and/or rear side 13 of the decorative layer 11. In the present case, the illumination and/or display unit 15 is inserted such that the base body 17 extends into the recess over the entire length L of the recess, fills the recess 14 in the transverse direction Q and projects beyond the edge of the recess 14.

In a further step e), a transparent or translucent protective and/or optical layer 21 made of a lacquer, for example PUR, is applied, for example sprayed or poured, onto the front side 12 of the decorative layer 11. In the present case, the protective and/or optical layer 21 fills the holes 22 completely.

LIST OF REFERENCE SIGNS

10 Shaped part
11 Decorative layer
11' Decorative material
11a Portion of the decorative layer
11a' Portion of the decorative material
11b Section of the decorative layer
11b' Section of the decorative material
12 Front side of the decorative layer
12' Front side of the decorative material
13 Rear side of the decorative layer
13' Rear side of the decorative material
14 Recess
15 Illumination and/or display unit
16 Illumination and/or display elements
17 Base body
18 Front side of the base body
19 Rear side of the base body
20 Fastening element
21 Protective and/or optical layer
22 Hole
A longitudinal axis of a hole
F Direction along the surface normal of the front side (depth direction)
Q Direction perpendicular to the surface normal of the front side (transverse direction)
$D_a$ Thickness of the decorative layer 11
$D_b$ Thickness of section 11b of the decorative layer 11
L Length of the recess in direction F
B Projection of the base body beyond the rear side of the decorative layer 11

I claim:

1. A shaped part comprising:
a decorative layer having a front side designed as a visible side and a rear side opposite the front side, wherein the decorative layer has a recess which extends into the decorative layer starting from the rear side, and
an illumination and/or display unit having one or more illumination and/or display elements for realizing an illumination and/or for displaying a notification on the front side of the decorative layer,
wherein:
the illumination and/or display unit comprises a base body made of a light-conducting material,
the illumination and/or display elements are embedded in the base body,
the base body is arranged at least partially in the recess in the decorative layer,
the illumination and/or display elements are embedded in the base body, and the base body is arranged at least partially in the recess, such that light emanating from the illumination and/or display element(s) is or can be guided in each case via the base body, towards the front side, and through the recess,
the base body extends beyond the recess starting from the rear side of the decorative layer in a vertical direction perpendicular to the rear side of the decorative layer and in a lateral direction along the rear side of the decorative layer.

2. The shaped part according to claim 1, wherein:
the recess extends into the decorative layer from the rear side of the decorative layer over a length (L) of about 70 to 90% of the thickness (Da) of the decorative layer.

3. The shaped part according to claim 1, wherein:
a section (11b) of the decorative layer formed between the recess and the front side of the decorative layer has one or more holes each extending linearly along their respective longitudinal axis (A) between the recess and the front side of the decorative layer.

4. The shaped part according to claim 1, wherein:
the illumination and/or display elements are embedded in the base body on a rear side of the base body opposite the front side of the decorative layer.

5. The shaped part according to claim 1, wherein:
the base body completely fills the recess in a depth direction (F) and/or in a transverse direction (Q) extending perpendicular to the depth direction (F).

6. The shaped part according to claim 1, wherein:
the shaped part has one or more fastening elements which are integrated into the base body or arranged on the base body or are formed by the base body.

7. The shaped part according to claim 1, wherein:
a transparent or translucent protective and/or optical layer is arranged or applied on the front side of the decorative layer.

8. A method for producing a shaped part comprising a decorative layer having a front side designed as a visible side and a rear side opposite the front side, wherein the decorative layer has a recess which extends into the decorative layer from the rear side of the decorative layer, and comprising an illumination and/or display unit with a base body and one or more illumination and/or display elements embedded in the base body for realizing an illumination and/or for displaying a notification on the front side of the decorative layer, the method comprising the steps of:

a) providing a decorative material (11') to form the decorative layer;

b) introducing a recess into the decorative material (11') from a rear side (13') of the decorative material (11') forming the rear side of the decorative layer;

c) providing and/or producing an illumination and/or display unit comprising a base body made of a light-conducting material and one or more illumination and/or display elements embedded in the base body;

d) assembling the illumination and/or display unit and decorative material (11') by inserting or introducing the illumination and/or display unit into the recess from the rear side (13') of the decorative material (11') provided as the rear side of the decorative layer, wherein the base body extends beyond the recess starting from the rear side of the decorative layer in a vertical direction perpendicular to the rear side of the decorative layer and in a lateral direction along the rear side of the decorative layer.

9. The method according to claim 8, wherein:

the recess is introduced from the rear side (13') of the decorative material (11') forming the rear side of the decorative layer such that the recess extends into the decorative layer over a length of about 70 to 90% of the thickness of the decorative layer.

10. The method according to claim 8, wherein:

one or more holes each extending linearly along their respective longitudinal axis (A) between the recess and the front side (12') of the decorative material (11') are introduced into a section (11b') of the decorative material (11') formed between the recess and a front side (12') of the decorative material (11') forming the front side of the decorative layer.

11. The method according to claim 8, wherein:

step c) comprises the steps of:

c1) providing one or more illumination and/or display elements;

c2) forming the base body such that it can be introduced or inserted into the recess; and c3) embedding the illumination and/or display elements into the base body such that light emanating from the illumination and/or display element(s) is guided in each case via the base body, towards the front side (12'), and through the recess.

12. The method according to claim 11, wherein:

the illumination and/or display elements are embedded into the base body on a rear side of the base body.

13. The method according to claim 11, wherein:

the base body is designed such that its shape and/or dimension corresponds to the recess and/or extends beyond the recess.

14. The method according to claim 8, wherein:

one or more fastening elements are integrated into the base body or arranged on the base body or are formed by the base body.

15. The method according to claim 8, wherein:

in a further step e), a transparent or translucent protective and/or optical layer is applied to the front side of the decorative layer, in particular such that it extends into the holes.

* * * * *